US008831139B2

(12) United States Patent
Kong et al.

(10) Patent No.: US 8,831,139 B2
(45) Date of Patent: *Sep. 9, 2014

(54) METHOD AND SYSTEM FOR DELAY MATCHING IN A RAKE RECEIVER

(75) Inventors: Hongwei Kong, Denville, NJ (US); Nelson Sollenberger, Farmingdale, NJ (US); Li Fung Chang, Holmdel, NJ (US); Zoran Kostic, Holmdel, NJ (US); Mark Hahm, Hartland, WI (US)

(73) Assignee: Broadcom Corporation, Irvine, CA (US)

( * ) Notice: Subject to any disclaimer, the term of this patent is extended or adjusted under 35 U.S.C. 154(b) by 1799 days.

This patent is subject to a terminal disclaimer.

(21) Appl. No.: 11/607,438

(22) Filed: Dec. 1, 2006

(65) Prior Publication Data

US 2008/0132190 A1    Jun. 5, 2008

(51) Int. Cl.
*H04B 1/10*    (2006.01)
*H04B 1/7115*    (2011.01)
*H04B 1/7117*    (2011.01)

(52) U.S. Cl.
CPC ............ *H04B 1/7115* (2013.01); *H04B 1/7117* (2013.01); *H04B 2201/70701* (2013.01)
USPC ............................. 375/316; 375/148; 455/296

(58) Field of Classification Search
CPC .................................................. H04B 1/7117
USPC ................................... 375/316, 148; 455/296
See application file for complete search history.

(56) References Cited

U.S. PATENT DOCUMENTS

| | | | |
|---|---|---|---|
| 6,128,329 A | 10/2000 | Takakusaki | |
| 6,912,243 B1 * | 6/2005 | Ishioka | 375/147 |
| 2003/0053560 A1 | 3/2003 | Paviot | |
| 2003/0081562 A1 * | 5/2003 | Iwamatsu et al. | 370/314 |
| 2003/0174686 A1 * | 9/2003 | Willenegger et al. | 370/342 |
| 2003/0210735 A1 * | 11/2003 | Ahn et al. | 375/148 |
| 2004/0017843 A1 * | 1/2004 | Fitton et al. | 375/148 |
| 2004/0028013 A1 | 2/2004 | Fitton et al. | |
| 2004/0064310 A1 | 4/2004 | Banba et al. | |
| 2004/0242156 A1 * | 12/2004 | Tiirola et al. | 455/25 |
| 2006/0165156 A1 * | 7/2006 | Kanemoto et al. | 375/145 |
| 2006/0229051 A1 * | 10/2006 | Narayan et al. | 455/296 |
| 2007/0140320 A1 * | 6/2007 | Banna et al. | 375/148 |

FOREIGN PATENT DOCUMENTS

| | | |
|---|---|---|
| CN | 1463496 A | 12/2003 |
| DE | 199 29 727 | 1/2001 |

OTHER PUBLICATIONS

European Search Report corresponding to European Patent Application No. 07014443.1-2411, dated Feb. 16, 2010.
Chinese Office Action dated Apr. 27, 2012, in Chinese Application No. 200710193888 to Kong et al., filed Nov. 29, 2007; 4 pages.

* cited by examiner

*Primary Examiner* — Michael Neff
(74) *Attorney, Agent, or Firm* — Sterne, Kessler, Goldstein & Fox P.L.L.C.

(57) ABSTRACT

Certain aspects of a method and system for delay matching in a rake receiver are disclosed. Aspects of one method may include compensating for a delay associated with at least one or both of the following in a rake receiver: a control channel and a data channel, prior to individual processing of received data by the data channel and individual processing of received data by the control channel. The data channel or the dedicated physical channel (DPCH) may be delayed with respect to the control channel, which may comprise, for example, the common pilot control channel (CPICH), by a particular time period.

33 Claims, 5 Drawing Sheets

METHOD AND SYSTEM FOR DELAY MATCHING IN A RAKE RECEIVER

CROSS-REFERENCE TO RELATED APPLICATIONS/INCORPORATION BY REFERENCE

This application makes reference to:
U.S. patent application Ser. No. 11/566,173 filed on Dec. 1, 2006; and
U.S. patent application Ser. No. 11/566,208 filed on Dec. 1, 2006.

FIELD OF THE INVENTION

Certain embodiments of the invention relate to rake receivers. More specifically, certain embodiments of the invention relate to a method and system for delay matching in a rake receiver.

BACKGROUND OF THE INVENTION

Mobile communications has changed the way people communicate and mobile phones have been transformed from a luxury item to an essential part of every day life. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The GPRS and EDGE technologies may be utilized for enhancing the data throughput of present second generation (2G) systems such as GSM. The GSM technology may support data rates of up to 14.4 kilobits per second (Kbps), while the GPRS technology, may support data rates of up to 115 Kbps by allowing up to 8 data time slots per time division multiple access (TDMA) frame. The GSM technology, by contrast, may allow one data time slot per TDMA frame. The EDGE technology, may support data rates of up to 384 Kbps. The EDGE technology may utilize 8 phase shift keying (8-PSK) modulation for providing higher data rates than those that may be achieved by GPRS technology. The GPRS and EDGE technologies may be referred to as "2.5G" technologies.

The UMTS technology, with theoretical data rates as high as 2 Mbps, is an adaptation of the WCDMA 3G system by GSM. One reason for the high data rates that may be achieved by UMTS technology systems is the 5 MHz WCDMA channel bandwidths versus the 200 KHz GSM channel bandwidths. The HSDPA technology is an Internet protocol (IP) based service, oriented for data communications, which adapts WCDMA to support data transfer rates of the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel.

In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance. A RAKE receiver contains a bank of spreading sequence correlators, each receiving an individual multipath. A RAKE receiver operates on multiple discrete paths. The received multipath signals may be combined in several ways, from which maximum ratio combining (MRC) is preferred in a coherent receiver. However, a RAKE receiver may be suboptimal in many practical systems. For example, its performance may degrade from multiple access interference (MAI), that is, interference induced by other users in the network.

In the case of a WCDMA downlink, MAI may result from intercell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intracell interference may be caused by multipath propagation. In some instances, intracell interference may comprise inter-path interference (IPI). IPI may occur when one or more paths, or RAKE "fingers," interfere with other paths within the RAKE receiver. Due to the non-zero cross-correlation between spreading sequences with arbitrary time shifts, interference occurs between propagation paths (or RAKE fingers) after despreading, thereby causing MAI. The level of intracell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. As the number of transmit and receive antennas increases, the system complexity, power consumption, and overall cost may increase. In addition, conventional methods of signal processing at the receiver side of a wireless communication system do not take into account outside interference as well as IPI resulting within a multipath fading environment. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for delay matching in a rake receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for delay matching in a rake receiver. Certain aspects of the invention may include compensating for a delay associated with at least one or both of the following in a rake receiver: a control channel and a data channel, prior to individual processing of received data by the data channel and individual processing of received data by the control channel. The data channel or the dedicated physical channel (DPCH) may be delayed with respect to the control channel, which may comprise, for example, the common pilot control channel (CPICH), by a particular time period.

Figure 1A:
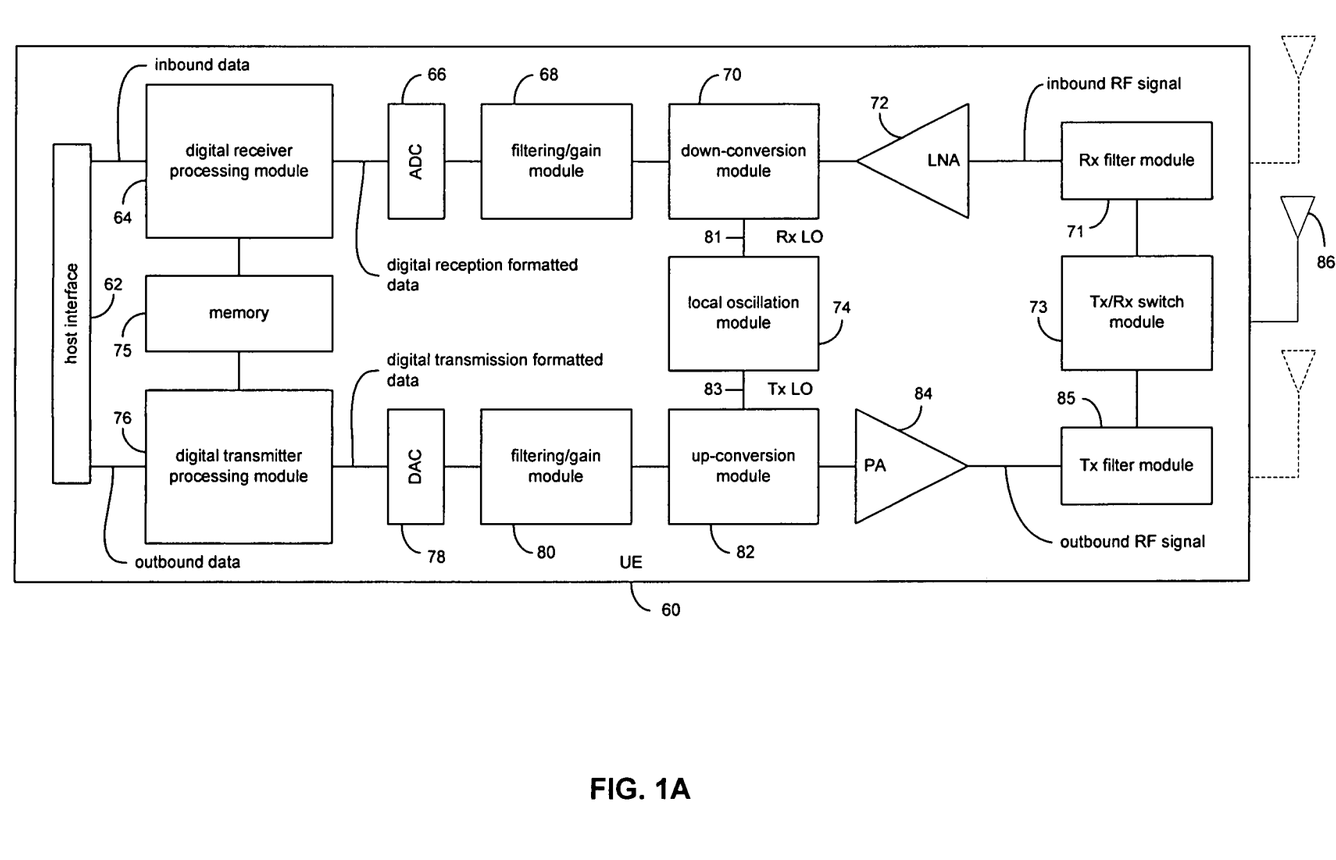
FIG. 1A is a block diagram illustrating a wireless communication user equipment, in accordance with an embodiment of the invention.

FIG. 1A is a block diagram illustrating a wireless communication user equipment, in accordance with an embodiment of the invention. Referring to FIG. 1A, there is shown a user equipment (UE) 60.

The UE 60 may comprise a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 may be shared by the transmit and receive paths as regulated by the Tx/Rx switch module 73.

The digital receiver processing module 64 and the digital transmitter processing module 76, in combination with operational instructions stored in the memory 75, may be enabled to execute digital receiver functions and digital transmitter functions, respectively. The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 64 and 76, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. For example, the memory 75 may be a read-only memory, random access memory, volatile memory, non-volatile memory, static memory, dynamic memory, flash memory, and/or any device that stores digital information. When the digital receiver processing module 64 and/or the digital transmitter processing module 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. The memory 75 may be enabled to store, and digital receiver processing module 64 and/or digital transmitter processing module 76 may be enabled to execute, operational instructions corresponding to at least some of the functions illustrated herein.

In operation, the UE 60 may be enabled to receive outbound data via host interface 62. The host interface 62 may be enabled to route outbound data to the digital transmitter processing module 76. The digital transmitter processing module 76 may be enabled to process the outbound data in accordance with a particular wireless communication standard or protocol, for example, IEEE 802.11a, IEEE 802.11b, and Bluetooth to produce digital transmission formatted data. The digital transmission formatted data may be a digital baseband signal or a digital low IF signal, where the low IF may be in the frequency range of one hundred kilohertz to a few megahertz, for example.

The digital-to-analog converter 78 may be enabled to convert the digital transmission formatted data from the digital domain to the analog domain. The filtering/gain module 80 may be enabled to filter and/or adjusts the gain of the analog baseband signal prior to providing it to the up-conversion module 82. The up-conversion module 82 may be enabled to directly convert the analog baseband signal, or low IF signal, into an RF signal based on a transmitter local oscillation 83 provided by the local oscillation module 74. The power amplifier 84 may enable amplification of the RF signal to produce an outbound RF signal, which may be filtered by the transmitter filter module 85. The antenna 86 may be enabled to transmit the outbound RF signal to a targeted device such as a base station, an access point and/or another wireless communication device.

The UE 60 may be enabled to receive an inbound RF signal via antenna 86, which was transmitted by a base station, an access point, or another wireless communication device. The antenna 86 may be enabled to communicate the inbound RF signal to the receiver filter module 71 via Tx/Rx switch module 73, where Rx filter module 71 bandpass filters inbound RF signal. The Rx filter module 71 may be enabled to communicate the filtered RF signal to the low noise amplifier 72, which may amplify the inbound RF signal to generate an amplified inbound RF signal. The low noise amplifier 72 may be enabled to communicate the amplified inbound RF signal to the down-conversion module 70, which may directly convert the amplified inbound RF signal into an inbound low IF signal or baseband signal based on a receiver local oscillation 81 provided by local oscillation module 74. The down-conversion module 70 may be enabled to communicate the inbound low IF signal or baseband signal to the filtering/gain module 68. The filtering/gain module 68 may be enabled to filter and/or attenuate the inbound low IF signal or the inbound baseband signal to produce a filtered inbound signal.

The analog-to-digital converter 66 may be enabled to convert the filtered inbound signal from the analog domain to the digital domain to generate digital reception formatted data. The digital receiver processing module 64 may be enabled to decode, descramble, demap, and/or demodulate digital reception formatted data to recapture inbound data. The host interface 62 may be enabled to communicate the recaptured inbound data to a wireless communication host device.

The local oscillation module 74 may be enabled to adjust an output frequency of a received local oscillation signal. The local oscillation module 74 may be enabled to receive a frequency correction input to adjust an output local oscillation signal to generate a frequency corrected local oscillation signal output.

Figure 1B:
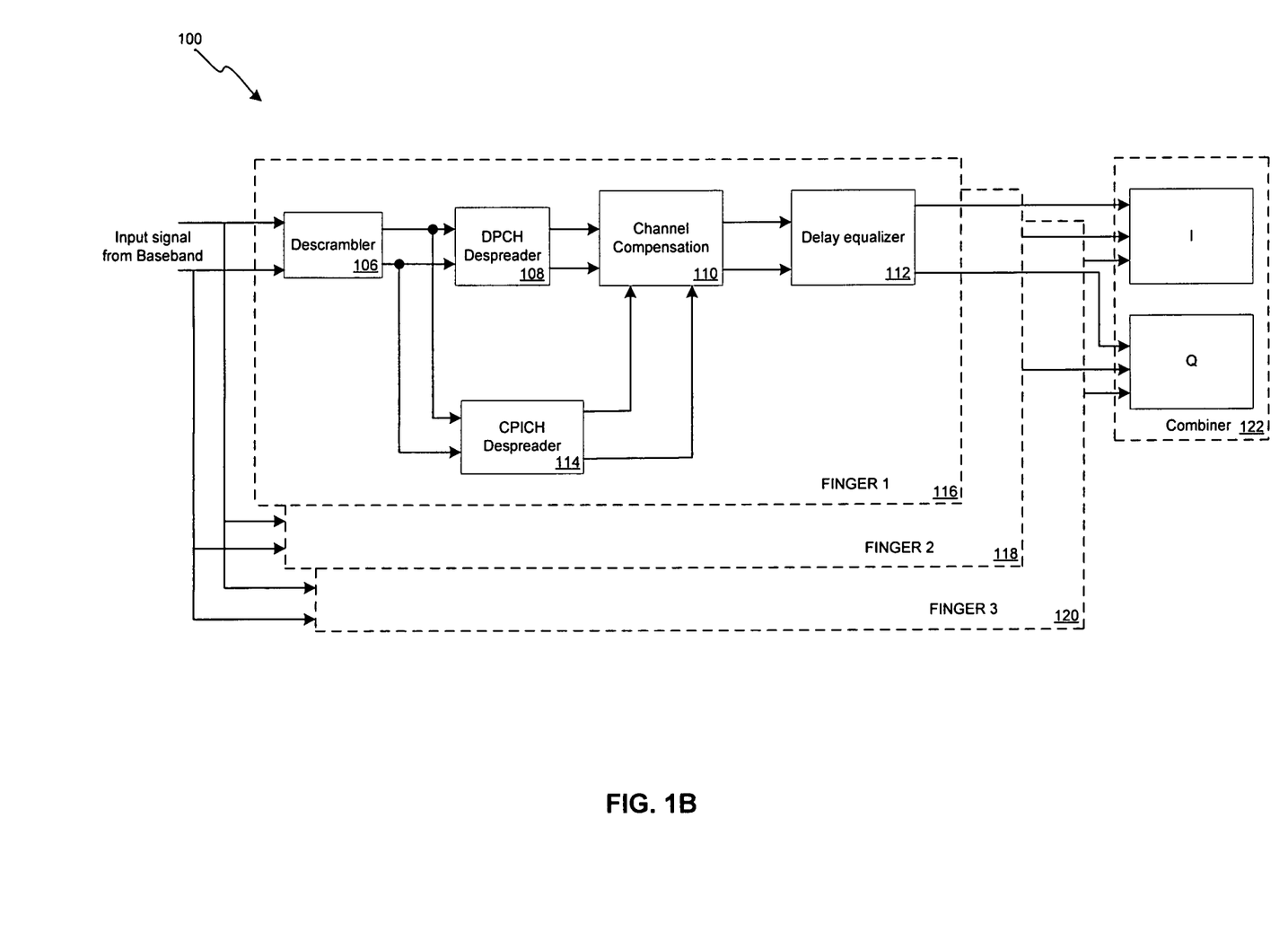
FIG. 1B is a block diagram of an exemplary rake receiver, in accordance with an embodiment of the invention.

FIG. 1B is a block diagram of an exemplary rake receiver, in accordance with an embodiment of the invention. Referring to FIG. 1B, there is shown a rake receiver 100. The rake receiver 100 may comprise a plurality of rake fingers, finger 1 116, finger 2 118, finger 3 120, and a combiner 122. Each rake finger, for example, finger 1 116 may comprise a descrambler 106, a DPCH despreader 108, a CPICH despreader 114, a channel compensation block 110, and a delay equalizer 112.

Each of the rake fingers, for example, finger 0 116, finger 1 118, and finger 3 120 may be enabled to receive an input signal from baseband. The descrambler 106 may comprise suitable logic, circuitry and/or code that may be enabled to multiply the received signals by a scrambling code and delayed versions of the scrambling code. Each delay may correspond to a separate multipath that may be combined by the rake receiver 100. The DPCH despreader 108 may comprise suitable logic, circuitry and/or code that may be enabled to despread the descrambled data of each path in the data channel by multiplying the descrambled data with a spreading code. The CPICH despreader 114 may comprise suitable logic, circuitry and/or code that may be enabled to despread the descrambled data of each path in the control channel by multiplying the descrambled data with a spreading code.

The channel compensation block 110 may comprise suitable logic, circuitry, and/or code that may be enabled to receive a plurality of generated channel estimates for each channel based on the descrambled signals and generate a plurality of derotated output signals to the delay equalizer 110. The delay equalizer 112 may comprise suitable logic, circuitry and/or code that may be enabled to receive an input signal from the channel compensation block 110 and generate a delayed output signal to the combiner 122 to compensate for the delay in the difference of arrival times of symbols at each finger. The combiner 122 may comprise suitable logic, circuitry, and/or code that may be enabled to receive the I and Q signals from each finger, for example, finger 1 116, finger 2 118, and finger 3 120, and combine the received signals based on a combining algorithm, for example, maximum ratio combining.

The rake receiver 100 may be a radio receiver that may be designed to counter the effects of multipath fading by using a plurality of sub-receivers. Each sub-receiver may be delayed in order to tune to an individual multipath component. Each component may be decoded independently, and combined, which may result in a higher signal-to-noise ratio (SNR) (or Eb/No) in a multipath environment.

In the rake receiver 100, one rake finger may be assigned to each multipath, which may result in maximizing the amount of received signal energy. Each of these different multipath signals may be combined to form a composite signal that may have substantially better characteristics than a single path. The received signal may be split into a plurality of independent paths, which may be combined with their corresponding channel estimates.

Figure 2:
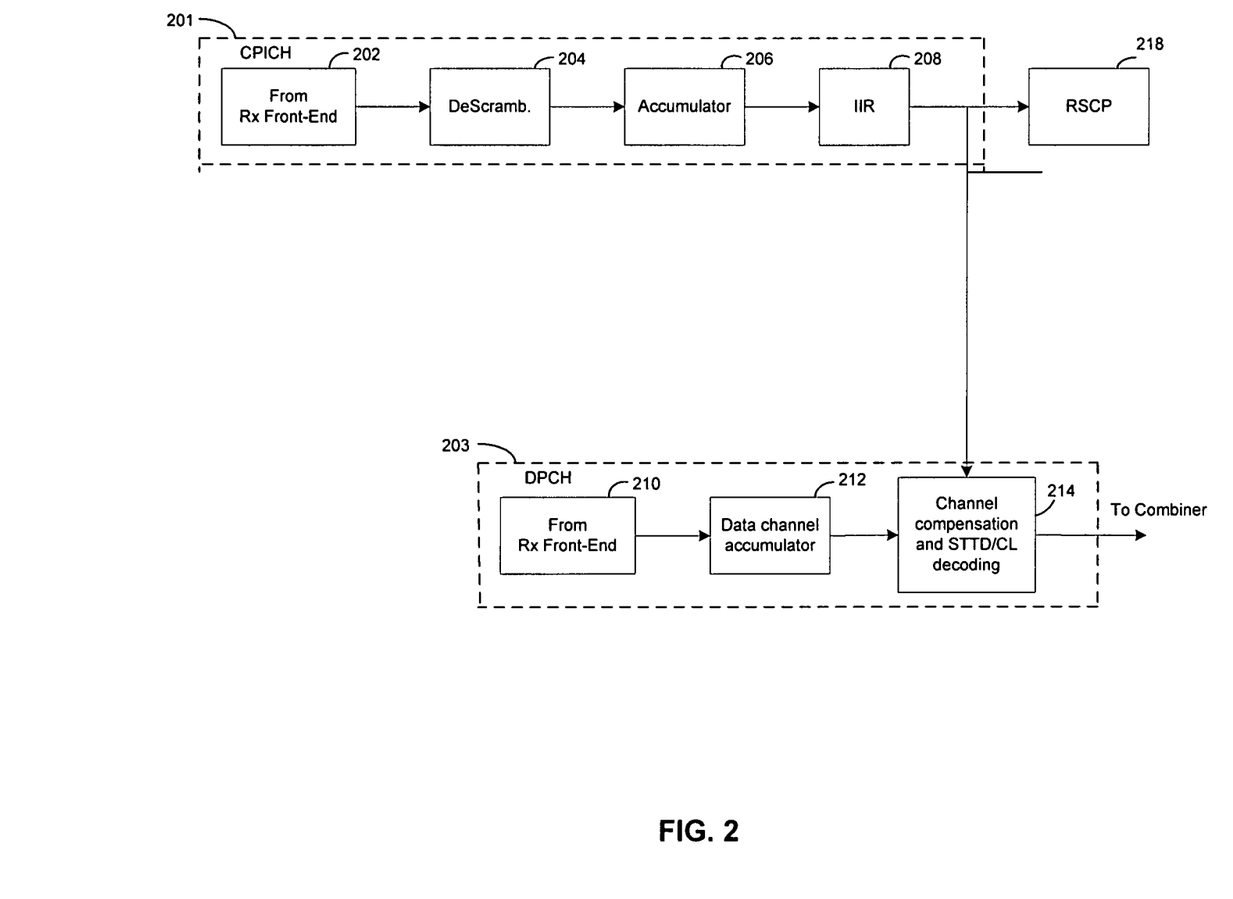
FIG. 2 is a block diagram illustrating processing latencies in an exemplary CPICH and DPCH, in accordance with an embodiment of the invention.

FIG. 2 is a block diagram illustrating processing latencies in an exemplary CPICH and DPCH, in accordance with an embodiment of the invention. Referring to FIG. 2, there is shown a CPICH 201, a received signal code power (RSCP) block 218, and a DPCH 203. The CPICH 201 may comprise a receiver frontend block 202, a descrambler 204, an accumulator 206, and an IIR filter 208. The DPCH 203 may comprise a receiver frontend block 210, a data channel accumulator 212, and a channel compensation and decoding block 214.

The plurality of receiver frontend blocks 202 and 210 may comprise suitable logic, circuitry, and/or code that may be enabled to process a received RF signal from an antenna. The plurality of receiver frontend blocks 202 and 210 may perform, for example, filtering, amplification, and analog-to-digital (A/D) conversion operations. The plurality of receiver frontend blocks 202 and 210 may be enabled to amplify and convert the received analog RF signals down to baseband. The plurality of receiver frontend blocks 202 and 210 may each comprise an analog-to-digital (A/D) converter that may be utilized to digitize the received analog baseband signal.

The descrambler 204 may comprise suitable logic, circuitry, and/or code that may be enabled to multiply the received signals by a scrambling code and delayed versions of the scrambling code. Each delay may correspond to a separate multipath that may be combined by the rake receiver 100. The descrambler 204 may be enabled to despread the descrambled data of each path by multiplying the descrambled data with the spreading code. The descrambler 204 may also be enabled to multiply the received signals by a scrambling code and/or orthogonal variable spreading factor (OVSF) code.

The accumulator 206 may comprise suitable logic, circuitry, and/or code that may be enabled to accumulate the descrambled signals from the descrambler 204. The accumulator 206 may be enabled to accumulate a plurality of signals and a latency or delay may be introduced in the CPICH 201 based on a particular acquisition mode that may be selected. For example, when the selected acquisition mode is equal to 1, the latency or delay introduced in the CPICH 201 may be equal to 256*N chips, where N=1, 2, . . . , 10. Similarly, when the selected acquisition mode is equal to 0, for example, the latency or delay introduced in the CPICH 201 may be equal to 128*N chips. The IIR filter 208 may comprise suitable logic, circuitry, and/or code that may be enabled to IIR filter the received signal paths from the accumulators 206. The latency or delay introduced by the IIR filter 208 may be equal to 256*N chips, or 128*N chips, for example, for low frequencies. The delay may reduce as frequency of the received signals is increased. The demodulator 220 may comprise suitable logic, circuitry, and/or code that may be enabled to demodulate the filtered received signals. The RSCP block 218 may comprise suitable logic, circuitry, and/or code that may be enabled to measure the receive signal code power of the filtered output signal of CPICH 201.

The data channel accumulator 212 may comprise suitable logic, circuitry, and/or code that may be enabled to accumulate the descrambled signals in the DPCH 203. The data channel accumulator 212 may be enabled to accumulate a plurality of signals and a latency or delay may be introduced in the DPCH 203. The delay in the DPCH 203 may be based on the spreading factor (SF) used to despread the received signals. For example, the delay may be equal to SF chips.

The channel compensation and decoding block 214 may utilize the channel estimation data received from the IIR filter 208 and combine the symbols obtained via different transmit antennas using the corresponding channel estimation data and generate an output signal to a combiner.

The channel estimates may carry inherent delay that may be mismatched by the corresponding DPCH processing. The accumulation block 206 may be enabled to utilize 512-chip accumulation, for example, and may introduce a delay that may be equal to 512 chips. The IIR filter 208 may be enabled to operate on a 512-chip sample interval, for example, and may have a latency of 1 sample (512 chip) approximately. The total latency introduced by CPICH 201 may be about 1024 chips, for example. The DPCH 203 may be delayed with respect to the CPICH 201 by about (1024-SF) chips, for example. The delay between the DPCH 203 and the CPICH 201 may be based on the user equipment (UE) velocity, group delay, or frequency variations, for example.

Figure 3:
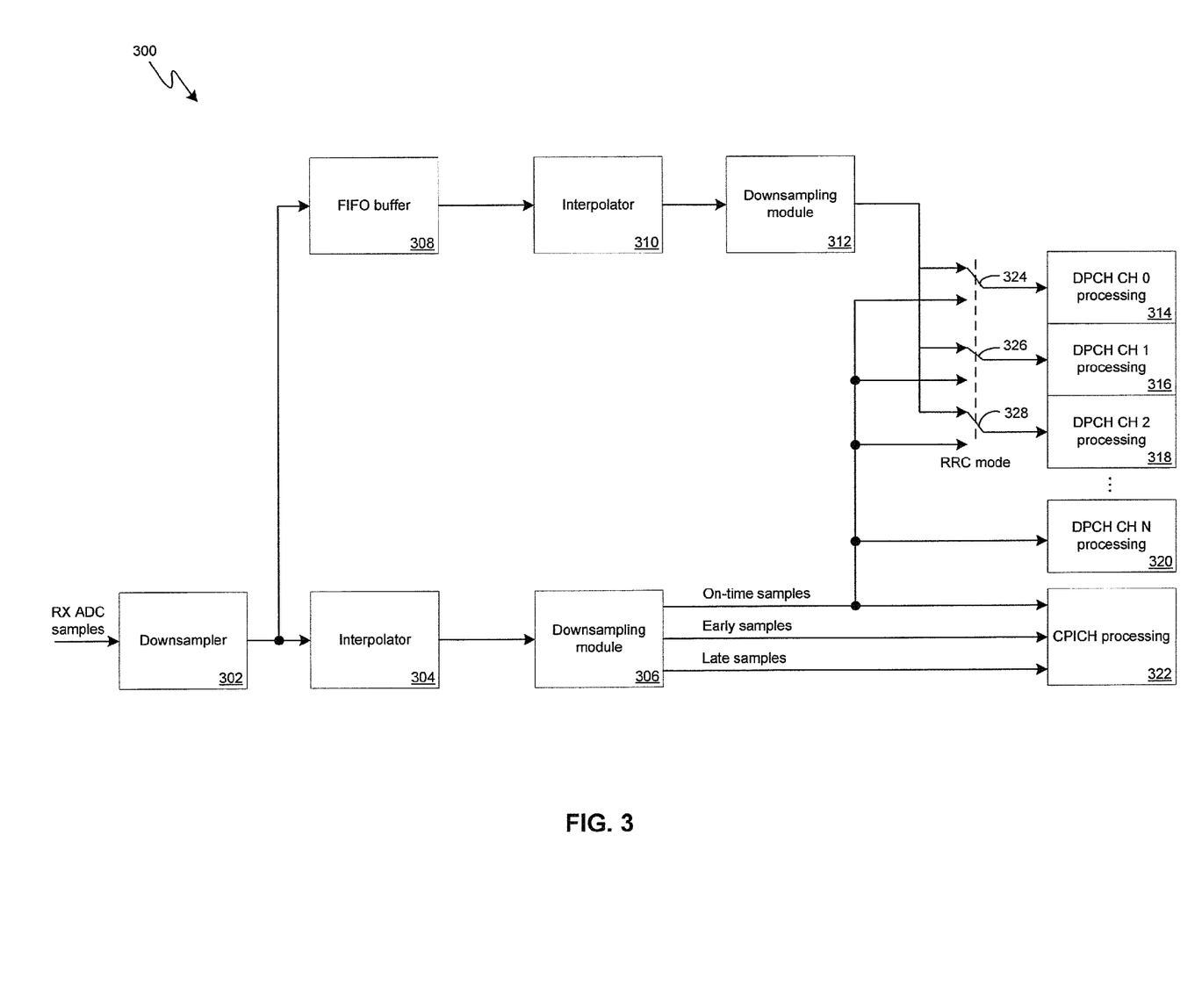
FIG. 3 is a block diagram illustrating exemplary delay matching in a rake receiver, in accordance with an embodiment of the invention.

FIG. 3 is a block diagram illustrating exemplary delay matching in a rake receiver, in accordance with an embodiment of the invention. Referring to FIG. 3, there is shown a rake receiver 300 that comprises a down-sampler 302, a plurality of interpolators 304 and 310, a plurality of delay matching modules 306 and 312, a FIFO buffer 308, a plurality of switches, 324, 326, and 328, a plurality of data channel processing blocks, DPCH CH 0 processing block 314, DPCH CH 1 processing block 316, DPCH CH 2 processing block 318, and DPCH CH N processing block 320.

The down-sampler 302 may comprise suitable logic, circuitry, and/or code that may be enabled to down-sample the received data to about twice the chip rate, for example. The down-sampling of the received data to about twice the chip rate, for example, may be based on, for example, when a bit indicating a rake receiver finger enable status is set. The received data may be generated by an analog to digital converter (ADC) and may be, for example, 8 times chip-rate sampling. The down-sampler 302 may be enabled to down-sample the received data by a factor of 4, for example. Notwithstanding, the down-sampler 302 may be enabled to down-sample the received data by any other suitable factor.

The interpolator 304 may comprise suitable logic, circuitry, and/or code that may be enabled to up-sample the received down-sampled data to regenerate the received data. The FIFO buffer 308 may be enabled to delay the received down-sampled data for a particular time period by storing and/or buffering the received down-sampled data to compensate for the mismatched delay associated with the data channel, for example, DPCH 203. The interpolator 310 may be enabled to up-sample the delayed down-sampled data to regenerate the received data.

The downsampling module 312 may comprise suitable logic, circuitry, and/or code that may be enabled to receive the regenerated received data and output the chip rate data to the corresponding data processing channel, for example, DPCH CH 0 314, DPCH CH 1 316, DPCH CH 2 318, and/or DPCH CH N 320. The plurality of delay matching modules 312 and 306 may enable downsampling of the interpolated data to a lower rate such as chip rate for example, with different phase or sub-chip offset for compensation for a delay associated with at least one or more of the following: a control channel, for example, the CPICH 201 and a data channel, for example, the DPCH 203. The downsampling for the CPICH 201 and/or the DPCH 203 may be performed prior to at least one or more of the following: control channel processing of received data, for example, CPICH processing block 322 and the data channel processing of received data, for example, DPCH CH 0 processing 314, DPCH CH 1 processing 316, DPCH CH 2 processing 318, and/or DPCH CH N processing 320. The data channel, for example, DPCH 203 may be delayed with respect to the control channel, for example, CPICH 201 by a particular time period, as controlled by the size of the FIFO buffer 308.

The rake receiver 300 may be enabled to select a mode of operation for each of a plurality of data channels, for example, DPCH CH 0 processing 314, DPCH CH 1 processing 316, DPCH CH 2 processing 318, and/or DPCH CH N processing 320 in the rake receiver 300. The downsampling module 312 may be enabled to individually compensate for the delay associated with each of the plurality of data channels, for example, DPCH CH 0 processing 314, DPCH CH 1 processing 316, DPCH CH 2 processing 318, and/or DPCH CH N processing 320 in the rake receiver 300 based on the selected mode of operation. The selected mode of operation may be, for example, a radio resource control (RRC) mode of operation.

When the RRC mode of operation is selected, the plurality of switches 324, 326, and 328 may be individually switched to select the delayed samples of received data from the downsampling module 312. For example, the switches 324 and 326 may be switched to select the delayed samples of the received data from the downsampling module 312 to the corresponding data processing channels, for example, DPCH CH 0 314, and DPCH CH 1, 316. If the RRC mode of operation is not selected, the on-time samples of the received data may be output to the corresponding data processing channel. For example, DPCH CH N 320 may be enabled to receive the on-time samples from the downsampling module 306.

The downsampling module 306 may be enabled to receive the regenerated received data from the interpolator 304 and generate on-time samples of the received data, early samples of the received data and late samples of the received data. The CPICH processing block 322 may be enabled to receive the generated on-time samples of the received data, early samples of the received data and late samples of the received data to compensate for the delay associated with the control channel, for example, CPICH 201, prior to control channel processing of the received data, where the early and the late samples may be used for finger tracking.

Figure 4:
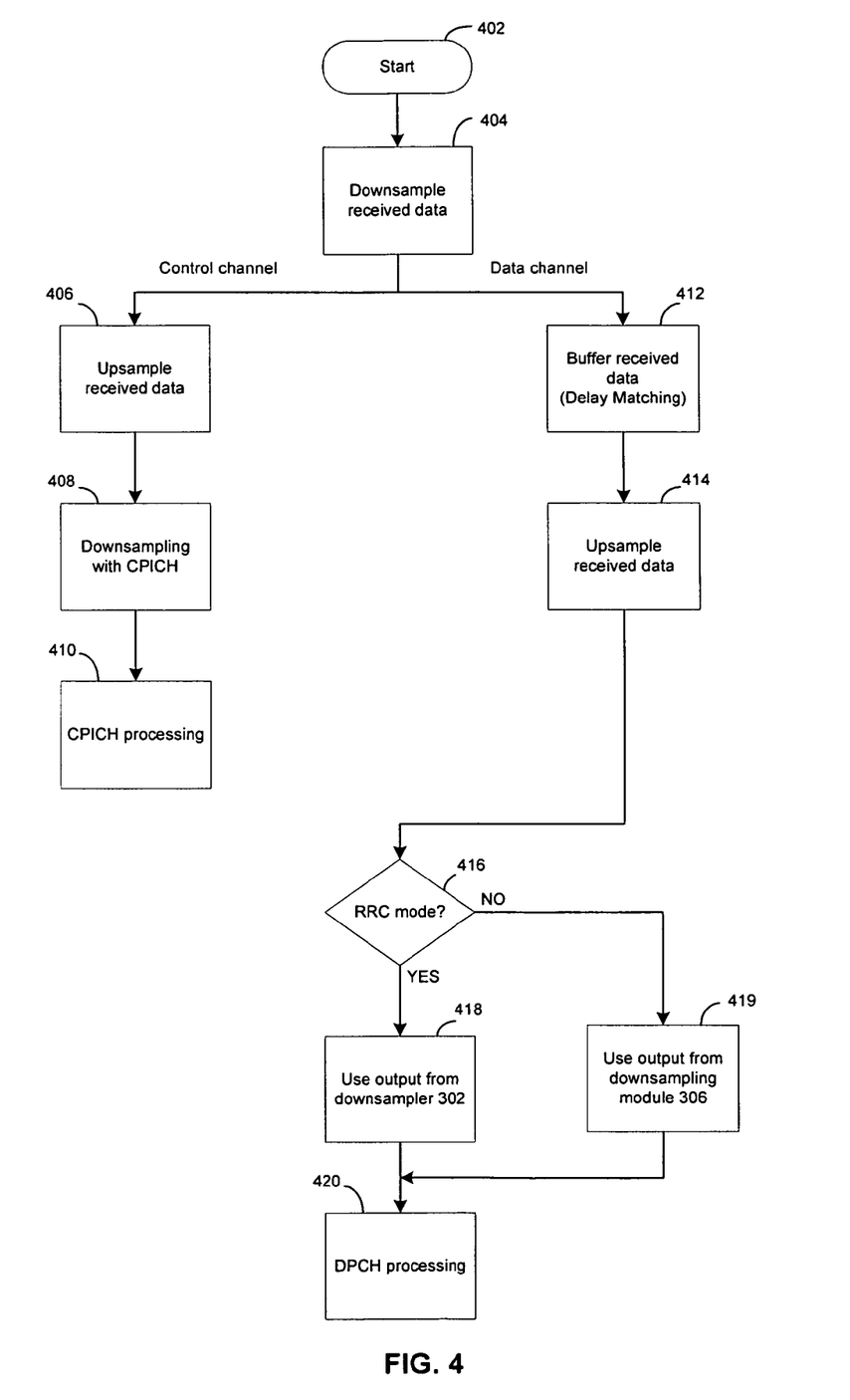
FIG. 4 is a flowchart illustrating exemplary steps for delay matching in a rake receiver, in accordance with an embodiment of the invention.

FIG. 4 is a flowchart illustrating exemplary steps for delay matching in a rake receiver, in accordance with an embodiment of the invention. Referring to FIG. 4, exemplary steps may begin at step 402. In step 404, the down-sampler 302 may be enabled to down-sample the received data. In step 404, for the control channel path, the received down sampled data may be up-sampled to regenerate the received data. In step 408, the downsampling module 306 may be enabled to downsample the regenerated received data from the interpolator 304 and generate on-time samples of the received data, early samples of the received data and late samples of the received data. In step 410, the CPICH processing block 322 may be enabled to receive the generated on-time samples of the received data, early samples of the received data and late samples of the received data.

In step 412, for the data channel path, the FIFO buffer 306 may be enabled to buffer the down-sampled received data to compensate for the delay associated with the data channel, for example, DPCH 203. In step 414, the interpolator 310 may be enabled to up-sample the buffered down-sampled received data. In step 416, it may be determined whether the rake receiver is operating in a particular RRC mode. If the rake receiver is not operating in a particular RRC mode, the on-time samples of the received data may be output to the corresponding data processing channel. In step 419, the output of downsampling module 306 may be utilized for the control channel processing. In step 420, the DPCH CH N 320 and CPICH 322 may be enabled to receive the on-time samples from the downsampling module 306.

If the particular RRC mode of operation is selected, control passes to step 418. In step 418, the plurality of switches 324, 326, and 328 may be individually switched to select the delayed samples of received data from the downsampling module 312 and utilize the output of the downsampler 302. For example, the switches 324 and 326 may be switched to select the delayed samples of the received data from the downsampling module 312 to the corresponding data processing channels, for example, DPCH CH 0 314, and DPCH CH 1, 316. The downsampling module 312 may be enabled to individually compensate for the delay associated with each of the plurality of data channels, for example, DPCH CH 0 processing 314, DPCH CH 1 processing 316, DPCH CH 2 processing 318, and/or DPCH CH N processing 320 in the rake receiver 300. In step 420, the plurality of data channels, may process the received data, for example, DPCH CH 0 processing 314, DPCH CH 1 processing 316, DPCH CH 2 processing 318, and/or DPCH CH N processing 320 in the rake receiver 300.

In accordance with an embodiment of the invention, a method and system for delay matching in a rake receiver may comprise a downsampling module 306 or 312 in the rake receiver 300 that may enable compensation for a delay associated with at least one or both of the following: a control channel, for example, the CPICH 201 and a data channel, for example, the DPCH 203. The compensation of the delay associated with the CPICH 201 and/or the DPCH 203 may be performed prior to at least one or both of the following: control channel processing of received data, for example, CPICH processing block 322 and the data channel processing of received data, for example, DPCH CH 0 processing 314, DPCH CH 1 processing 316, DPCH CH 2 processing 318, and/or DPCH CH N processing 320. The data channel, for example, DPCH 203 may be delayed with respect to the control channel, for example, CPICH 201 by a particular time period.

The down-sampler 302 may be enabled to down-sample the received data. The FIFO buffer 306 may be enabled to buffer the down-sampled received data to compensate for the delay associated with the data channel, for example, DPCH 203. The interpolator 310 may be enabled to up-sample the buffered down-sampled received data. The interpolator 304 may be enabled to up-sample the down-sampled received data. The rake receiver 300 may be enabled to select a mode of operation for each of a plurality of data channels, for example, DPCH CH 0 processing 314, DPCH CH 1 processing 316, DPCH CH 2 processing 318, and/or DPCH CH N processing 320 in the rake receiver 300. The downsampling module 312 may be enabled to downsample the plurality of data channels, for example, DPCH CH 0 processing 314, DPCH CH 1 processing 316, DPCH CH 2 processing 318, and/or DPCH CH N processing 320 in the rake receiver 300 based on the selected mode of operation. The selected mode of operation may be, for example, a radio resource control mode of operation.

Another embodiment of the invention may provide a machine-readable storage, having stored thereon, a computer program having at least one code section executable by a machine, thereby causing the machine to perform the steps as described above for delay matching in a rake receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
    in a rake receiver:
        receiving data including control channel data and data channel data associated with a control channel and a data channel respectively;
        delaying the data channel data with respect to the control channel data; and
        selecting, for subsequent individual channelized processing, one of the data channel data or the delayed data channel data based on a mode of operation that is specified in a wireless communications protocol.

2. The method according to claim 1, wherein the delaying the data channel data includes delaying the delay channel data with respect to the control channel data by a particular time period.

3. The method according to claim 1, wherein said control channel is a common pilot control channel (CPICH).

4. The method according to claim 1, wherein said data channel is a dedicated physical channel (DPCH).

5. The method according to claim 1, further comprising up-sampling the delayed data channel data prior to the selecting.

6. The method according to claim 1, further comprising down-sampling the data channel data prior to delaying the data channel data.

7. The method according to claim 1, wherein the receiving data further includes receiving data that includes a plurality of data channel data associated with a respective plurality of data channels, the delaying includes delaying the plurality of data channel data to provide a respective plurality of corresponding delayed data channel data, and wherein the selecting further includes selecting, for each of the plurality of data channels, one of the respective plurality of data channel data or a corresponding one of the respective plurality of delayed data channel data in said rake receiver based on a corresponding mode of operation associated with each of the respective plurality of data channels.

8. The method according to claim 7, wherein at least one of the corresponding modes of operation is a radio resource control (RRC) mode.

9. The method according to claim 1, wherein the mode of operation is a radio resource control (RRC) mode.

10. The method according to claim 1, wherein the delaying includes using a first-in-first-out (FIFO) buffer.

11. The method according to claim 1, wherein the selecting includes selecting the delayed data channel data when the mode of operation is a radio resource control (RRC) mode.

12. The method according to claim 1, wherein the selecting includes selecting the data channel data when the mode of operation is a mode of operation other than a radio resource control (RRC) mode.

13. A non-transitory machine-readable storage having stored thereon, a computer program having at least one code section for processing signals, the at least one code section being executable by a machine for causing the machine to perform a method comprising:
in a rake receiver:
receiving data including control channel data and data channel data associated with a control channel and a data channel respectively;
delaying the data channel data with respect to the control channel data; and
selecting, for subsequent individual channelized processing, one of the data channel data or the delayed data channel data based on a mode of operation that is specified in a wireless communications protocol.

14. The non-transitory machine-readable storage according to claim 13, wherein the delaying the data channel data includes delaying the delay channel data with respect to the control channel data by a particular time period.

15. The non-transitory machine-readable storage according to claim 13, wherein said control channel is a common pilot control channel (CPICH).

16. The non-transitory machine-readable storage according to claim 13, wherein said data channel is a dedicated physical channel (DPCH).

17. The non-transitory machine-readable storage according to claim 13, wherein said at least one code section further comprises code being executable by the machine for causing the machine to perform up-sampling the delayed data channel data prior to the selecting.

18. The non-transitory machine-readable storage according to claim 17, wherein the mode of operation is a radio resource control (RRC) mode.

19. The non-transitory machine-readable storage according to claim 13, wherein said at least one code section further comprises code for receiving data that further includes receiving data that includes a plurality of data channel data associated with a respective plurality of data channels, the delaying further includes delaying the plurality of data channel data to provide a respective plurality of corresponding delayed data channel data, and the selecting further includes selecting, for each of the plurality of data channels, one of the respective plurality of data channel data or a corresponding one of the respective plurality of delayed data channel data in said rake receiver based on a corresponding mode of operation associated with each of the respective plurality of data channels.

20. The non-transitory machine-readable storage according to claim 19, wherein at least one of the corresponding modes of operation is a radio resource control (RRC) mode.

21. The non-transitory machine-readable storage according to claim 13, wherein the mode of operation is a radio resource control (RRC) mode.

22. The non-transitory machine-readable storage according to claim 13, wherein the delaying includes using a first-in-first-out (FIFO) buffer.

23. A system for processing signals, the system comprising:
one or more circuits in a rake receiver configured to:
receive data including control channel data and data channel data associated with a control channel and a data channel respectively;
delay the data channel data with respect to the control channel data; and
select, for subsequent individual channelized processing, one of the data channel data, or the delayed data channel data based on a mode of operation that is specified in a wireless communications protocol.

24. The system according to claim 23, wherein the one or more circuits are further configured to delay the data channel data with respect to the control channel data by a particular time period.

25. The system according to claim 23, wherein said control channel is a common pilot control channel (CPICH).

26. The system according to claim 23, wherein said data channel is a dedicated physical channel (DPCH).

27. The system according to claim 23, wherein said one or more circuits are further configured to up-sample the delayed data channel data prior to selecting, for subsequent individual channelized processing, one of the data channel data or the delayed data channel data based on a mode of operation.

28. The system according to claim 23, wherein said one or more circuits are further configured to down-sample the data channel data prior to delaying the data channel data with respect to the control channel data.

29. The system according to claim 23, wherein said one or more circuits are further configured to receive data that includes a plurality of data channel data associated with a respective plurality of data channels, to delay the plurality of data channel data to provide a respective plurality of corresponding delayed data channel data, and to select, for each of the plurality of data channels, one of the respective plurality of data channel data or a corresponding one of the respective plurality of delayed data channel data in said rake receiver based on a corresponding mode of operation associated with each of the respective plurality of data channels.

30. The system according to claim 29, wherein at least one of the corresponding modes of operation is a radio resource control (RRC) mode.

31. The system according to claim 23, wherein the mode of operation is a radio resource control (RRC) mode.

32. The system according to claim 23, wherein the one or more circuits configured to delay the data channel data includes a first-in-first-out (FIFO) buffer.

33. A system, for processing signals, the system comprising:
one or more circuits in a rake receiver configured to:
receive data including control channel data and data channel data associated with a control channel and a data channel respectively;
delay the data channel data with respect to the control channel data;
determine whether a mode of operation is a radio resource control (RRC) mode;
select the delayed data channel data when the mode of operation is the RRC mode; and
select the data channel data when the mode of operation is a mode of operation other than the RRC mode.

* * * * *

UNITED STATES PATENT AND TRADEMARK OFFICE
CERTIFICATE OF CORRECTION

| | | |
|---|---|---|
| PATENT NO. | : 8,831,139 B2 | Page 1 of 1 |
| APPLICATION NO. | : 11/607438 | |
| DATED | : September 9, 2014 | |
| INVENTOR(S) | : Kong et al. | |

It is certified that error appears in the above-identified patent and that said Letters Patent is hereby corrected as shown below:

IN THE CLAIMS:

Column 14, line 47, replace "A system, for" with --A system for--.

Signed and Sealed this
Twenty-fourth Day of February, 2015

Michelle K. Lee
*Deputy Director of the United States Patent and Trademark Office*